(12) United States Patent
Kan et al.

(10) Patent No.: US 9,106,572 B2
(45) Date of Patent: Aug. 11, 2015

(54) IMMOBILIZATION MODULE FOR SECURITY ON A COMMUNICATION SYSTEM

(75) Inventors: Chao Kan, Frisco, TX (US); Phu Thieu, Dallas, TX (US); Thierry Klein, Fanwood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 328 days.

(21) Appl. No.: 12/585,977

(22) Filed: Sep. 30, 2009

(65) Prior Publication Data

US 2011/0078763 A1 Mar. 31, 2011

(51) Int. Cl.
*H04W 12/06* (2009.01)
*H04L 12/24* (2006.01)
*H04L 29/06* (2006.01)

(52) U.S. Cl.
CPC ............ *H04L 41/28* (2013.01); *H04L 63/126* (2013.01); *H04W 12/06* (2013.01); *H04L 41/06* (2013.01)

(58) Field of Classification Search
None
See application file for complete search history.

(56) References Cited

U.S. PATENT DOCUMENTS

| | | | |
|---|---|---|---|
| 7,639,640 B2 | 12/2009 | Fujii et al. | |
| 2004/0143759 A1* | 7/2004 | Mendonca et al. | 713/201 |
| 2004/0152447 A1* | 8/2004 | McDonnell et al. | 455/411 |
| 2004/0225894 A1* | 11/2004 | Colvin | 713/200 |
| 2005/0039025 A1* | 2/2005 | Main et al. | 713/182 |
| 2006/0010329 A1* | 1/2006 | Aaron | 713/194 |
| 2006/0236111 A1* | 10/2006 | Bodensjo et al. | 713/176 |
| 2008/0008139 A1* | 1/2008 | Gupta et al. | 370/338 |
| 2008/0134299 A1* | 6/2008 | Posamentier | 726/4 |
| 2009/0086973 A1* | 4/2009 | Buddhikot et al. | 380/273 |

FOREIGN PATENT DOCUMENTS

| | | |
|---|---|---|
| CN | 1682488 A | 10/2005 |
| EP | 0 645 912 | 3/1995 |
| EP | 1 796 340 | 6/2007 |
| JP | 2003198571 A | 7/2003 |
| WO | WO 03/107133 | 12/2003 |

OTHER PUBLICATIONS

International Search Report and Written Opinion dated Mar. 14, 2011.
Notification Concerning Transmittal of International Preliminary Report on Patentability dated Apr. 12, 2012.
Japanese Notice of Reason for Refusal dated Jul. 18, 2013 for related Japanese Application No. 2012-532117 (full translation provided).

(Continued)

*Primary Examiner* — Benjamin Lanier
*Assistant Examiner* — Malcolm Cribbs
(74) *Attorney, Agent, or Firm* — Harness, Dickey and Pierce, P.L.C.

(57) ABSTRACT

Example embodiments are directed to a method of controlling a self-sufficient network system to prevent unauthorized use of the self-sufficient network. The method includes receiving an activation request from the self-sufficient network system and authenticating the self-sufficient network system based on the activation request. The self-sufficient network system is functional if the activation request is valid and the self-sufficient network system has reduced functionality if the activation request is not valid.

14 Claims, 4 Drawing Sheets

(56) References Cited

OTHER PUBLICATIONS

Office Action for corresponding Chinese Application No. 2010800435484 dated Jan. 6, 2014 and English translation thereof.
Office Action for corresponding Japanese Application No. 2012-532117 dated Mar. 19, 2014 and English translation thereof.
Office Action for corresponding Korean Application No. 10-2012-7010702 dated Jun. 23, 2014 and English translation thereof.
Office Action for corresponding Chinese Application No. 201080043548.4 dated Dec. 12, 2014 and English translation thereof.
Office Action for corresponding Korean Application No. 10-2014-7026757 dated Dec. 17, 2014 and English translation thereof.
Reexamination Report for corresponding Japanese Application No. 2012-532117 dated Oct. 28, 2014 and English translation thereof.

* cited by examiner

IMMOBILIZATION MODULE FOR SECURITY ON A COMMUNICATION SYSTEM

BACKGROUND

Most communication systems are usually fixed, installed and maintained in premises of service providers. Security mechanisms for operating the communication systems generally include a physical restriction of access to the communication system and software authentication for an end user to use the communication system. Thus, the likelihood of an unauthorized user obtaining physical access to a communication system is low.

However, in some mobile wireless systems such as deployable networks, mobile stations and associated networks can be operated anytime and anywhere. Consequently, the likelihood that such a system becomes stolen or physically hijacked is greater.

SUMMARY

Example embodiments are directed to an immobilization module for network systems that can be operated without any human control, with limited human control or with only remote control capabilities (self-sufficient networks).

At least one example embodiment discloses a method of controlling a self-sufficient network system from a service system to prevent unauthorized use of the self-sufficient network. The method includes receiving an activation request from the self-sufficient network system. The self-sufficient network system is then authenticated based on the activation request. The self-sufficient network system becomes functional if the activation request is valid and the self-sufficient network system has reduced functionality if the activation request is not valid.

Some other example embodiments provide a method of controlling a self-sufficient network system from a service system to prevent unauthorized use of the self-sufficient network system. The method includes transmitting a signal to the self-sufficient network system, receiving a signal from the self-sufficient network system and disabling the self-sufficient network system from the service system based on the signal. The signal indicates that the self-sufficient network system is being tampered with.

Other example embodiments disclose a method of automatically controlling a self-sufficient network system. The method includes detecting, by the self-sufficient network system, a tampering of the self-sufficient network system and transmitting, by the self-sufficient network system, a tampering alert if a tampering has occurred.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has been convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments are not limited by these aspects of any given implementation.

Example embodiments disclose an immobilization module for network systems that can be operated without any human control, with limited human control or with only remote control capabilities (self-sufficient networks). Network systems that are operated with limited human control are network systems that are turned on/off by a human and then may operate without human control. For example, the immobilization module may be implemented in a deployable network that is a compact and self-contained network in a box. The deployable network allows for users to establish voice, video, data and sensor communications without having to rely on any existing network infrastructure.

The immobilization module invalidates the network system (e.g., deployable network) when authentication of a normal operation decides that the system should not be operable. The immobilization module may invalidate a data plane, control plane and/or a management plane of the network system to disable the network system. Moreover, the immobilization module may authenticate itself.

Figure 1:
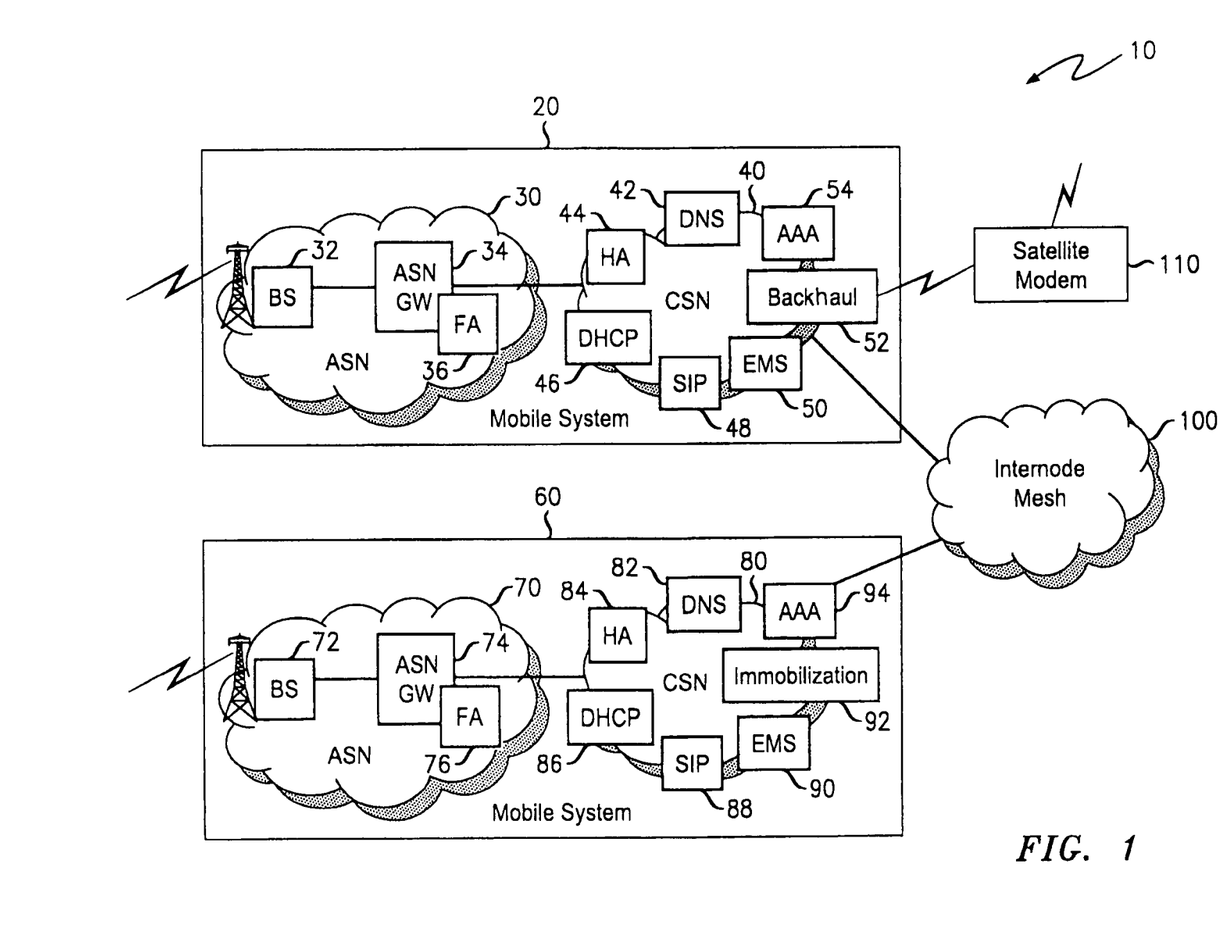
FIG. 1 illustrates an example embodiment of a network including self-sufficient network systems.

FIG. 1 illustrates an example embodiment of a network including mobile wireless systems. As shown in FIG. 1, a network 10 includes self-sufficient network systems 20 and 60. The self-sufficient network systems 20 and 60 may be mobile systems such as deployable networks and/or any other type of network that can be operated without any human control, with limited human control or with only remote control capabilities. FIG. 1 illustrates an example embodiment where the self-sufficient network systems 20 and 60 are mobile systems, such as deployable networks, however it should be understood that other self-sufficient network systems may be implemented.

Each of the self-sufficient network systems 20 and 60 may be a complete 4G wireless network in a box that is autonomous and independent from any network infrastructure. The self-sufficient network systems 20 and 60 are used in an ad hoc environment and include wireless access such as Worldwide Interoperability for Microwave Access (WiMAX), WiFi or Long Term Evolution (LTE). Furthermore, the self-sufficient network systems 20 and 60 may be auto-configured. For example, the self-sufficient network systems 20 and 60 may include dynamic self-configuration, dynamic IP address assignment and real-time configuration of integrated servers. The self-sufficient network systems 20 and 60 may communicate over a link through an internode mesh 100 and include a dynamic topology discovery.

The self-sufficient network systems 20 and 60 may also include advanced encryption standard (AES) 128-bit or 256-bit encryption for secure voice and data transmission.

The self-sufficient network system 20 includes an access service network (ASN) 30 and a core service network (CSN) 40.

The ASN 30 is a set of functions that includes a base station (BS) 32, an access services network gateway (ASN-GW) 34 and a foreign agent (FA) 36. As should be understood, the FA 36 stores information about mobile nodes visiting the self-sufficient network system 20. The BS 32 may communicate with a mobile station (not shown). The BS 32 may utilize any wireless access technology. For example, the network 10 illustrated in FIG. 1, utilizes IEEE 802.16e WiMAX technology.

The CSN 40 is a set of services that includes a domain name services (DNS) 42, a home agent (HA) 44, dynamic host configuration protocol (DHCP) 46, a session initiation protocol (SIP) 48, an element management system (EMS) 50, a backhaul 52 and authentication, authorization and accounting (AAA) 54. The CSN 40 may further include a mesh network module (not shown) that employs internode communication mechanisms. The DNS 42, HA 44, DHCP 46, SIP 48, EMS 50 and AAA 54 are well known in the art. Therefore, a more detailed description of the DNS 42, HA 44, DHCP 46, SIP 48, EMS 50 and AAA 54 will be omitted.

The backhaul 52 allows systems to access a public or private network through a satellite modem 110. While the satellite modem 110 is illustrated, one of ordinary skill should understand that the backhaul 52 may access a public or private network through other media, such as an Ethernet link.

The self-sufficient network system 60 includes an ASN 70 and a CSN 80. The ASN 70 is logically linked to the ASN 30. The ASN 70 includes a BS 72, an ASN-GW 74 and a FA 76. The ASN 70 is the same as the ASN 30. Therefore, for the sake of clarity and brevity a more detailed description of the ASN 70 will be omitted.

Like the CSN 40, the CSN 80 is a set of services. The CSN 80 includes a DNS 82, a HA 84, DHCP 86, a SIP 88, an EMS 90, an immobilization module 92 and AAA 94.

The self-sufficient network systems 20 and 60 may include tamper proof mechanisms such as a visual indication. The self-sufficient network systems 20 and 60 may also transmit a control signal indicating that the self-sufficient network system 20 or 60 has been tampered with based on whether the immobilization module 90 has detected a tampering.

The immobilization module 92 can communicate with all the system components such as the internode mesh 100, the backhaul 52, the HA 94, the EMS 90 and the AAA modules 54 and 94. Depending on the implementation, the immobilization module communicates with the components that are deemed critical. Critical components depend on customer and deployment scenarios. For example, the ASN 30 and the CSN 40 may be critical if the self-sufficient network system 20 to provide local access to mobile devices. For single node communication, the internode mesh 100 may not be critical, but may be critical form multi-node deployment scenarios.

If at least one of the self-sufficient network systems 20 and 60 are stripped down, then the AAA module 54 and 94 within the stripped down self-sufficient network system 20 and 60 is the critical component.

Additionally, the immobilization module 92 can invalidate a data plane of the self-sufficient network system 60 by disabling the HA 84 or wired interfaces, a control plane of the self-sufficient network system 60 by disabling the AAA module 94 and/or a management plane of the self-sufficient network system 60 by disabling the EMS 90.

The immobilization module 92 may employ at least three types of triggering and processing mechanisms: passive, active and self detection.

One of ordinary skill should understand that the self-sufficient network system 20 may further include an immobilization module and/or the self-sufficient network system 60 may further include a backhaul.

Figure 2:
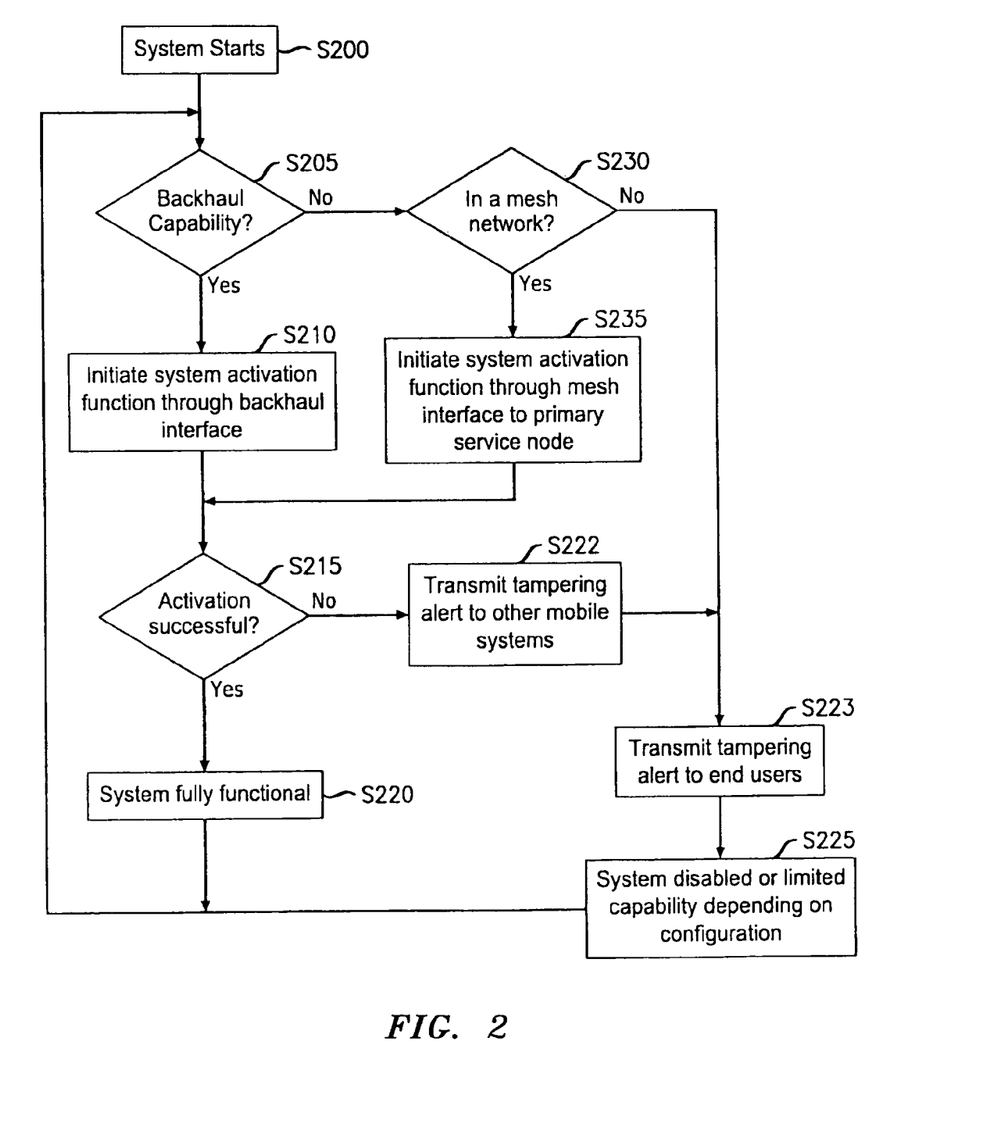
FIG. 2 illustrates a method of passively triggering and processing by a self-sufficient network system including an immobilization module according to an example embodiment.

FIG. 2 illustrates a method of passively triggering and processing by a self-sufficient network system including an immobilization module according to an example embodiment. An immobilization module with a self-sufficient network system, such as the immobilization module 92 included in the self-sufficient network system 60 may perform the method of FIG. 2.

As shown in FIG. 2, the passive method may be initiated internally by the self-sufficient network system. At S200, the self-sufficient network system starts up.

Before the self-sufficient network system begins normal operation, the self-sufficient network system determines whether the self-sufficient network system has backhaul capability, at S205. Normal operation may be defined as a system working in the way the system was designed or able to function in a role that the system was assigned. A backhaul component of the self-sufficient network system checks a status of a modem for a satellite backhaul or an interface for an Ethernet backhaul. If the modem or interface is up, the system is assigned to have a gateway role and the backhaul service will enabled. Otherwise, the backhaul service will be disabled.

If the self-sufficient network system has backhaul capability, the immobilization module initiates a system activation function through a backhaul interface, at S210, by transmitting an activation request to an authentication system such as a centralized command and control center. The activation request may include authentication information or encryption keys that the authentication system can recognize.

The authentication system authenticates the self-sufficient network system. Based on the authentication information or encryption keys included in the activation request, the authentication system determines whether the activation request is authentic.

If the self-sufficient network system determines that the self-sufficient network system does not have backhaul capability, at S205, the self-sufficient network system then determines whether the self-sufficient network system is in a mesh network, at S230. The self-sufficient network system may utilize a mesh network module that employs internode communication mechanisms to determine whether the self-sufficient network system is in a mesh network.

It should be understood that S205, S210 and S230, S235 may be interchanged, respectively. For example, if authentication through the mesh network has a higher priority than authentication through the backhaul capability, then S230 would be performed before S205.

If the self-sufficient network system is in a mesh network, the immobilization module initiates the system activation function through a mesh interface to a Primary Service Node (PSN) in the mesh network, at S235, by transmitting the activation request to the PSN. The system activation function through the mesh interface may be the same as the system activation function through the backhaul interface. The PSN may be the self-sufficient network system 20, for example.

The PSN authenticates the self-sufficient network system. Based on the authentication information or encryption keys included in the activation request, the PSN determines whether the activation request is authentic.

Based on a response from the authentication system or the PSN, the self-sufficient network system determines whether the activation was successful (e.g., whether the self-sufficient network system is authenticated), at S215.

If the activation was successful and the self-sufficient network system was authenticated, the self-sufficient network system starts normal operation, at S220. If the activation was not successful and the self-sufficient network system was not authenticated, the self-sufficient network system transmits a tampering alert to other self-sufficient network systems, at S222. The other self-sufficient network systems may change their respective routing tables so no traffic is routed to the non-authenticated self-sufficient network system. After transmitting the tampering alert or if the backhaul and mesh network are not available, the self-sufficient network system transmits the tampering alert to end users through an access interface, at S223. It should be understood that even if the backhaul or mesh network is available, the self-sufficient network system may transmit a tampering alert to the end users.

After transmitting the tampering alert to end users, at S223, the immobilization module disables the self-sufficient network system, at S225, or limits the capabilities of the self-sufficient network system depending on a configuration of the self-sufficient network system. For example, services within the self-sufficient network system will be allowed, while service through the backhaul or mesh network will be prohibited. The immobilization module may disable the self-sufficient network system by disabling all access interfaces or shutting down the AAA server so that an authentication for every user will fail, for example.

During operation of the self-sufficient network system, the self-sufficient network system may repeat the authentication periodically regardless of whether the self-sufficient network system is authenticated.

As one of ordinary skill will appreciate, the PSN or authentication system may at any time transmit a deactivation signal to the self-sufficient network system, thereby disabling the self-sufficient network system or reducing the functionality of the self-sufficient network system.

Figure 3A:
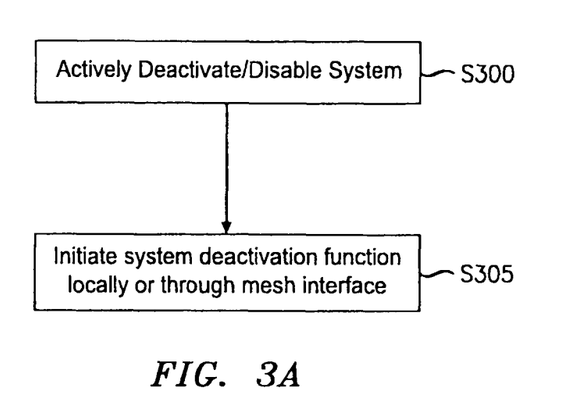
FIG. 3A illustrates a method of actively triggering and processing by a self-sufficient network system including an immobilization module according to an example embodiment.
Figure 3B:
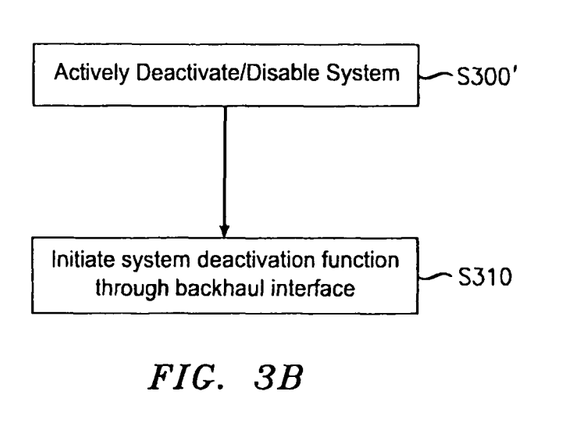
FIG. 3B illustrates a method of actively triggering and processing by a self-sufficient network system including an immobilization module according to an example embodiment.

FIGS. 3A-3B illustrate methods of actively triggering and processing by a self-sufficient network system including an immobilization module according to an example embodiment. An immobilization module with a self-sufficient network system, such as the immobilization module 92 included in the self-sufficient network system 60 may perform the methods of FIGS. 3A-3B.

As shown in FIG. 3A, at S300, a local system actively initiates a deactivate/disable procedure when the local system determines that the self-sufficient network system may have been tampered with or periodically, even if there is no indication of tampering.

At S305, the local system may initiate a system deactivation function locally or through a mesh interface when the local system determines that the self-sufficient network system may have been tampered with. The local system may be a node connected to the self-sufficient network system through a mesh interface, such as another deployable network that is a PSN. Another example of a local system is a team commander or senior team member that is in a "hot" spot where the self-sufficient network system is deployed and connected to the self-sufficient network system through an access interface.

The local system may determine that the self-sufficient network system may have been tampered with through intelligence or through a communication within the field.

The local system then transmits a signal to the self-sufficient network system from either a wireless or wired access interface. The signal includes a request for the self-sufficient network system to provide authentication information.

The local system determines whether the self-sufficient network system is in a tampered state based on authentication information received from the self-sufficient network. If the self-sufficient network system responds to the request by transmitting a signal including the correct authentication information, the self-sufficient network system continues operating normally. If the self-sufficient network system transmits incorrect authentication information, the local system transmits another signal to the self-sufficient network system to either disable or restrict the functionality of the self-sufficient network system. Based on the another signal, the immobilization module disables or restricts the functionality of the self-sufficient network system. The self-sufficient network system also transmits tampering alerts to other self-sufficient network systems and end users before the self-sufficient network system becomes disabled or is functionally restricted.

If the self-sufficient network system is remote, and not a node that the local system can directly connect to through the wired or wireless access interface, the local system will send both the authentication requesting signal and the deactivation signal across the mesh network from another self-sufficient network system through the mesh interface to the self-sufficient network system in question. The local system may decide whether to disable or restrict the functionality of the self-sufficient network system in question based on the signal or encryption key received from the self-sufficient network system in question.

As shown in FIG. 3B, at S300', an authentication system actively initiates a deactivate/disable procedure when the authentication system determines that the self-sufficient network system may have been tampered with or periodically, even if there is no indication of tampering.

At S310, the authentication system may initiate a system deactivation function through a backhaul interface when the authentication system determines that the self-sufficient network system may have been tampered with or periodically, even without a tampering indication. The authentication system may be a command and control center located in a different geographical location than the self-sufficient network system, for example.

If the authentication system determines that the self-sufficient network system may have been tampered with, the authentication system transmits a signal to the self-sufficient network system through the backhaul interface, requesting the self-sufficient network system to provide authentication information.

The authentication system determines whether the self-sufficient network system is in a tampered state based on authentication information received from the self-sufficient network. If the self-sufficient network system provides the correct authentication information to the authentication system, the self-sufficient network system continues operating normally. If the self-sufficient network system does not provide the correct authentication information, the authentication system transmits another signal to the self-sufficient network system to either disable or restrict the functionality of the self-sufficient network system. The authentication system may decide whether to disable or restrict the functionality of the self-sufficient network system in question based on the signal or encryption key received from the self-sufficient network system in question.

Based on the another signal, the immobilization module disables or restricts the functionality of the self-sufficient network system. The self-sufficient network system also transmits tampering alerts to other self-sufficient network systems and end users before the self-sufficient network system becomes disabled or is functionally restricted.

S305 and S310 of FIGS. 3A and 3B, respectively, may be operated in parallel. In both FIGS. 3A and 3B, the immobilization module may zero out encryption keys of the self-sufficient network if the self-sufficient network becomes disabled or functionally restricted by the immobilization module.

Figure 4:
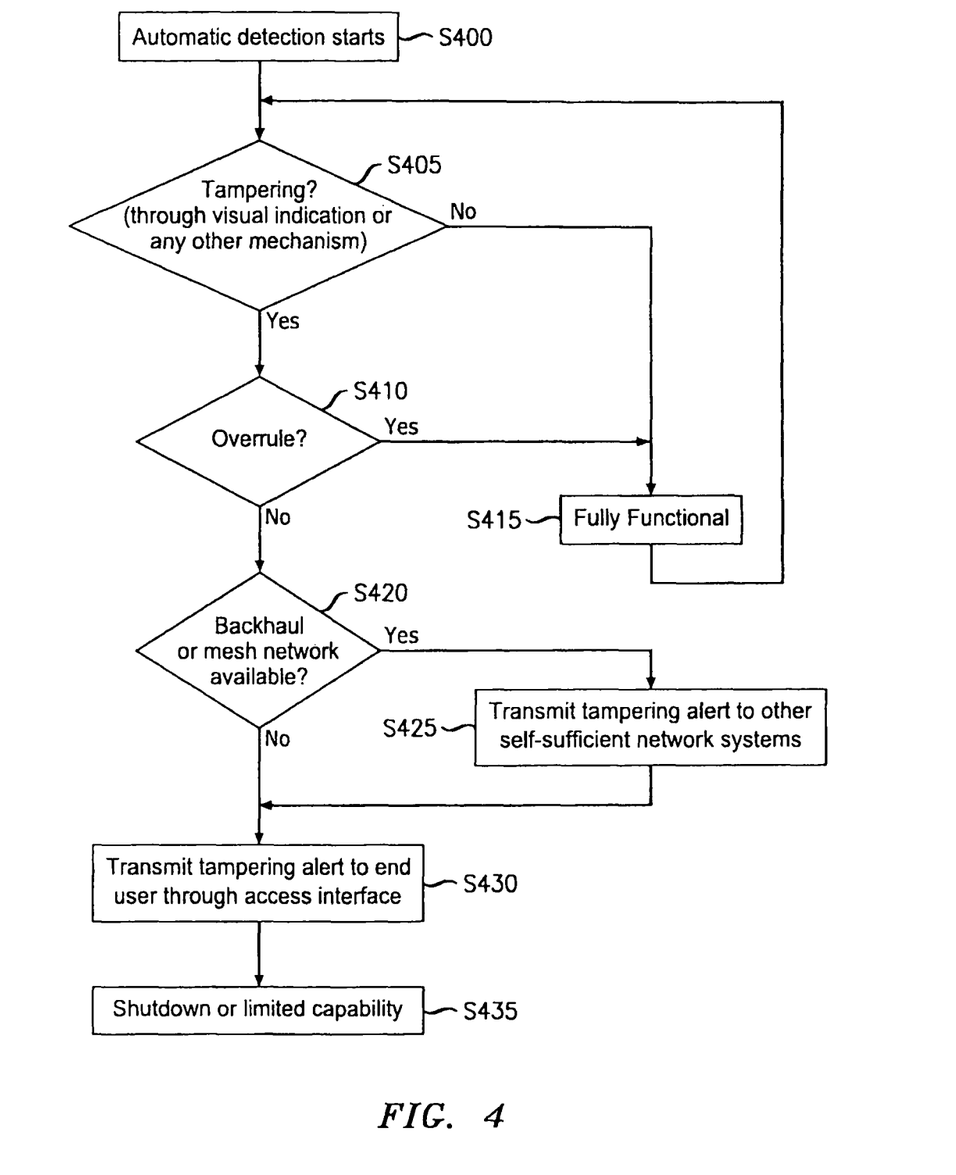
FIG. 4 illustrates a method of self-detecting a tampering in a self-sufficient network system with an immobilization module according to an example embodiment.

FIG. 4 illustrates a method of self-detecting a tampering in a self-sufficient network system with an immobilization module according to an example embodiment. An immobilization module with a self-sufficient network system, such as the self-sufficient network system 60 including the immobilization module 92 may perform the method of FIG. 4.

At S400, the self-sufficient network system starts automatic detection. The immobilization module determines whether the self-sufficient network system has been tampered with at S405. For example, the self-sufficient network system may have contact switches that send a signal to the immobilization module when an enclosure/chassis of the self-sufficient network system is opened without authorization. If the chassis is opened, the contact on the switch is no longer maintained which opens an electrical circuit and sends a trigger signal.

The self-sufficient network system also transmits a tampering alert to a local system or authentication system indicating that a tampering has occurred. The local system and authentication system may be the same as described in FIGS. 2-3B, therefore, a description of the local system and authentication system will not be provided for the sake of clarity and brevity.

If the immobilization module determines that the self-sufficient network system has been tampered with, the local system or authentication system determines whether to overrule the tampering alert. For example, in deliberate undercover and counter-espionage scenarios, the self-sufficient network system may be tampered with. However, the local or the authentication system may want to monitor the activities of the self-sufficient network system. Therefore, the tampering alert functions as a warning that the self-sufficient network system is about to be shutdown.

At S415, the self-sufficient network system becomes fully functional if a tampering has not occurred, at S405, or if the tampering alert is overruled, at S410. The local system or authentication system may transmit a non-disabling signal to overrule the tampering alert.

If the self-sufficient network system does not receive an overrule response (non-disabling signal) and the self-sufficient network is tampered with, then the self-sufficient network system determines whether a backhaul or mesh network is available, at S420. The local system or authentication system may also transmit a disabling signal to the self-sufficient network to instruct the self-sufficient network to disable or become functionally restricted. The tampering alert is transmitted by the self-sufficient network system to other self-sufficient network systems, at S425, if a backhaul or network is available. The other self-sufficient network systems may change their respective routing tables so no traffic is routed to the tampered self-sufficient network system.

If no backhaul or mesh network is available, or after transmitting the tampering alert, at S425, the self-sufficient network system transmits the tampering alert to end users of the self-sufficient network system through a wired or wireless access interface, at S430.

After transmitting the tampering alert to the end users, the self-sufficient network system is shutdown or restricted functionally by the immobilization module, at S435. The immobilization module may zero out encryption keys of the self-sufficient network at S435.

The self-sufficient network system including the immobilization module may also be configured to shutdown without transmitting a tampering alert when the self-sufficient network system includes backhaul or mesh network capability. Thus, the self-sufficient network system could bypass the overrule function.

Moreover, a service system may be referred to as at least one of an authentication system, PSN and local system.

Example embodiments being thus described, it will be obvious that the same may be varied in many ways. Such variations are not to be regarded as a departure from the spirit and scope of the claims, and all such modifications as would be obvious to one skilled in the art are intended to be included within the scope of the claims.

What is claimed is:

1. A method of controlling a self-sufficient network system to prevent unauthorized use of the self-sufficient network, the method comprising:
   receiving an activation request from the self-sufficient network system;
   authenticating the self-sufficient network system, the self-sufficient network system being functional if the activation request is valid and the self-sufficient network system having reduced functionality if the activation request is not valid, the self-sufficient network system being a deployable network system operating without relying on an established network infrastructure and enabling an exchange of multimedia information among components of the self-sufficient network;
   receiving an indication from the self-sufficient network system that the self-sufficient network system has been tampered with; and
   transmitting a deactivation signal to deactivate the self-sufficient network system in response to the received indication that the self-sufficient network system has been tampered with.

2. A method of controlling a self-sufficient network system to prevent unauthorized use of the self-sufficient network system, the method comprising:
   requesting, by a service system, authentication information;
   receiving, at the service system, the requested authentication information and an indication corresponding to a tampering state of the self-sufficient network system, from the self-sufficient network system, the self-sufficient network system being a deployable network system operating without relying on an established network infrastructure and enabling an exchange of multimedia information among components of the self-sufficient network; and
   transmitting, by the service system, a deactivation signal to deactivate the self-sufficient network system if the indication indicates that the self-sufficient network system has been tampered with.

3. The method of claim 2, wherein the requesting includes, requesting the authentication information over a mesh network.

4. The method of claim 2, wherein the requesting includes, requesting the authentication information through a backhaul interface.

5. A method of automatically controlling a self-sufficient network system, the method comprising:
   detecting, by the self-sufficient network system, a tampering of the self-sufficient network system, the self-sufficient network system being a deployable network system operating without relying on an established network infrastructure and enabling an exchange of multimedia information among components of the self-sufficient network;
   transmitting, by the self-sufficient network system, a tampering alert if a tampering has occurred; and
   receiving, by the self-sufficient network system, a deactivation signal to deactivate the self-sufficient network system upon transmitting the tampering alert.

6. The method of claim 5, wherein the transmitting includes,
zeroing out encryption keys of the self-sufficient network system.

7. The method of claim 5, wherein the transmitting includes,
transmitting the tampering alert to a node to indicate that the self-sufficient network system has been tampered with.

8. The method of claim 5, further comprising:
disabling the self-sufficient network system.

9. The method of claim 7, further comprising:
receiving a non-disabling signal from the node instructing the self-sufficient network system not to disable if the tampering alert is overruled.

10. The method of claim 1, wherein the receiving an activation request includes,
receiving an initial activation request from the self-sufficient network system if the self-sufficient network system is not authenticated, and
receiving periodic activation requests if the self-sufficient network system is authenticated.

11. The method of claim 10, wherein the method further includes,
disabling the self-sufficient network system if any of the periodic activation requests is invalid.

12. The method of claim 11, wherein the disabling the self-sufficient network system includes,
zeroing out encryption keys of the self-sufficient network system.

13. The method of claim 2, wherein the requesting the authentication information includes,
transmitting an initial request for the authentication information if the self-sufficient network system is not authenticated, and
transmitting periodic requests if the self-sufficient network system is authenticated.

14. The method of claim 13, wherein the method further includes,
disabling the self-sufficient network system if any of the periodic requests is invalid.

* * * * *